(12) United States Patent
Sakurai

(10) Patent No.: US 8,576,442 B2
(45) Date of Patent: Nov. 5, 2013

(54) COLOR COEFFICIENT APPARATUS, COLOR REPRODUCTION DEVICE, AND COMPUTER READABLE MEDIUM STORING PROGRAM

(75) Inventor: Takuya Sakurai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 345 days.

(21) Appl. No.: 13/021,326

(22) Filed: Feb. 4, 2011

(65) Prior Publication Data

US 2012/0013923 A1    Jan. 19, 2012

(30) Foreign Application Priority Data

Jul. 15, 2010 (JP) .................................. 2010-160915

(51) Int. Cl.
  *G06F 15/00* (2006.01)
  *G06K 1/00* (2006.01)
  *H04N 1/60* (2006.01)
  *G06F 3/08* (2006.01)

(52) U.S. Cl.
  USPC ............................................ 358/1.9; 358/518

(58) Field of Classification Search
  None
  See application file for complete search history.

(56) References Cited

U.S. PATENT DOCUMENTS

| | | | |
|---|---|---|---|
| 6,943,917 B2 | 9/2005 | Tamagawa | |
| 2007/0058181 A1* | 3/2007 | Hatori | 358/1.9 |
| 2008/0062442 A1* | 3/2008 | Olson | 358/1.9 |

FOREIGN PATENT DOCUMENTS

| | | |
|---|---|---|
| JP | A-2000-278547 | 10/2000 |
| JP | A-2002-152543 | 5/2002 |
| JP | A-2004-153667 | 5/2004 |
| JP | B2-3691322 | 6/2005 |
| JP | A-2006-279091 | 10/2006 |

* cited by examiner

*Primary Examiner* — Douglas Tran
(74) *Attorney, Agent, or Firm* — Oliff & Berridge, PLC

(57) ABSTRACT

A color conversion coefficient generating apparatus includes a first color reproduction characteristic obtaining unit that obtains a first color reproduction characteristic that is obtained by correcting a color reproduction characteristic of a first device in accordance with a color of a first medium used for printing in the first device, a second color reproduction characteristic obtaining unit that obtains a second color reproduction characteristic that is obtained by correcting a color reproduction characteristic of a second device in accordance with a color of a second medium used for printing in the second device, a modifying unit that modifies the first color reproduction characteristic and that repeatedly modifies the modified first color reproduction characteristic, and a generating unit that generates a color conversion coefficient for performing simulated printing based on the color reproduction characteristic of the first device on the basis of the first and second color reproduction characteristics.

6 Claims, 6 Drawing Sheets

COLOR COEFFICIENT APPARATUS, COLOR REPRODUCTION DEVICE, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-160915 filed Jul. 15, 2010.

BACKGROUND (i) Technical Field

The present invention relates to a color conversion coefficient generating apparatus, a color reproduction characteristic modifying device, and a computer readable medium storing a program.

SUMMARY

According to an aspect of the invention, there is provided a color conversion coefficient generating apparatus including: a first color reproduction characteristic obtaining unit that obtains a first color reproduction characteristic that is obtained by correcting a color reproduction characteristic of a first device in accordance with a color of a first medium used for printing in the first device; a second color reproduction characteristic obtaining unit that obtains a second color reproduction characteristic that is obtained by correcting a color reproduction characteristic of a second device in accordance with a color of a second medium used for printing in the second device; a modifying unit that modifies the first color reproduction characteristic obtained by the first color reproduction characteristic obtaining unit and that repeatedly modifies the modified first color reproduction characteristic; and a generating unit that generates a color conversion coefficient for performing, in the second device, simulated printing based on the color reproduction characteristic of the first device on the basis of the first color reproduction characteristic obtained by the first color reproduction characteristic obtaining unit and the second color reproduction characteristic obtained by the second color reproduction characteristic obtaining unit, and that regenerates the color conversion coefficient on the basis of the first color reproduction characteristic modified by the modifying unit and the second color reproduction characteristic obtained by the second color reproduction characteristic obtaining unit. The modifying unit modifies the first color reproduction characteristic on which a preceding modification has been performed and which has not been corrected in accordance with the color of the first medium on the basis of a difference between the first color reproduction characteristic obtained by the first color reproduction characteristic obtaining unit and a color reproduction characteristic that is obtained by correcting, in accordance with the color of the second medium, a color reproduction characteristic in a result of the simulated printing using the color conversion coefficient that is regenerated on the basis of the first color reproduction characteristic on which the preceding modification has been performed.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the attached drawings.

Figure 1:
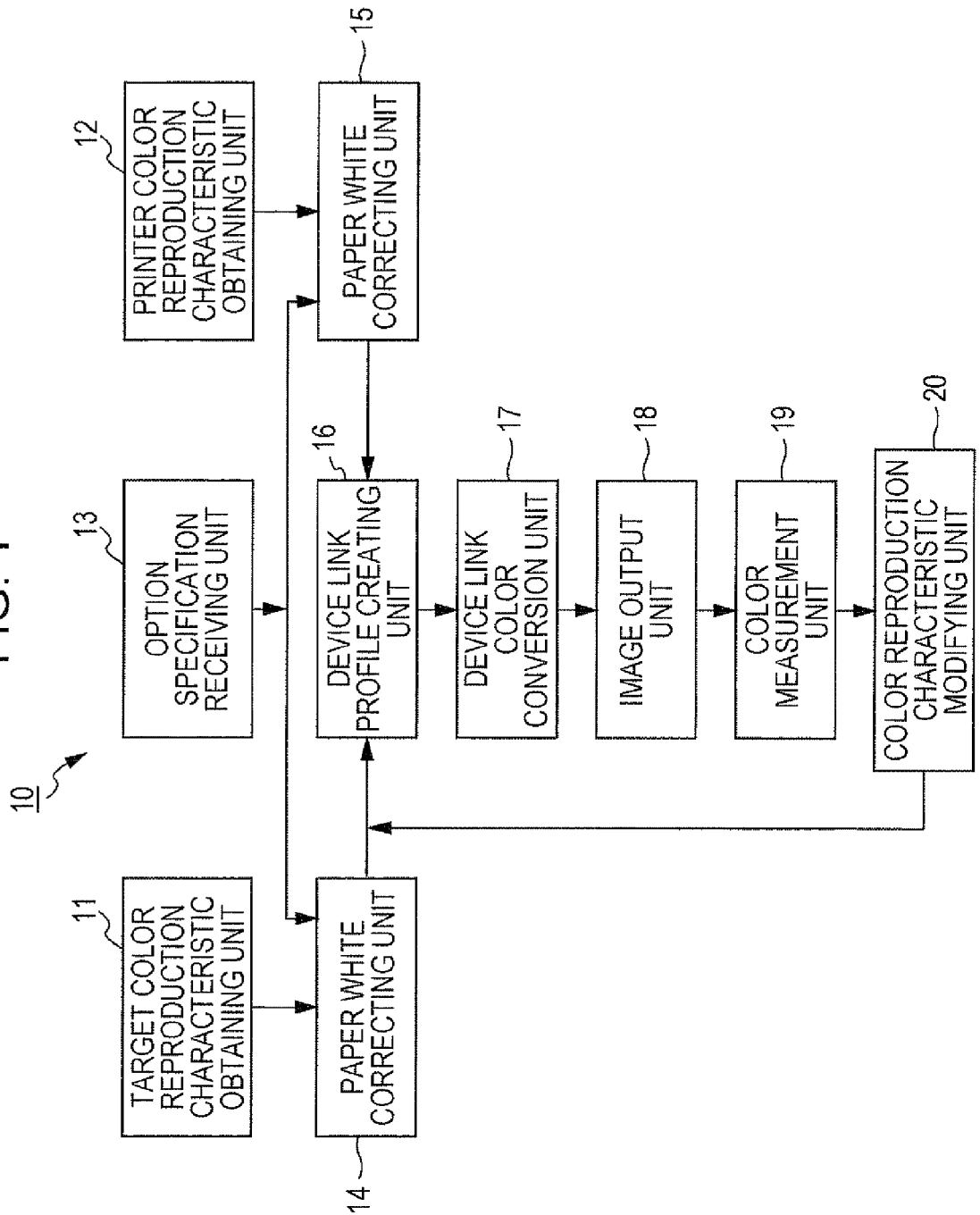
FIG. 1 is a block diagram illustrating an example functional configuration of a color conversion apparatus according to an exemplary embodiment of the present invention.

FIG. 1 illustrates an example functional configuration of a color conversion apparatus 10, which is an example of a color conversion coefficient generating apparatus according to the exemplary embodiment. The color conversion apparatus 10 creates a device link profile for converting color data that depends on a target device into color data that depends on a printer on the basis of the color reproduction characteristic of the target device, such as a printing machine, and the color reproduction characteristic of the printer, and performs color conversion using the device link profile. Particularly, in the color conversion apparatus 10 according to the exemplary embodiment, paper white correction is performed in view of the ground color of paper, and color conversion is performed using a device link profile that is based on the paper white correction.

As illustrated in FIG. 1, the color conversion apparatus 10 includes a target color reproduction characteristic obtaining unit 11, a printer color reproduction characteristic obtaining unit 12, an option specification receiving unit 13, paper white correcting units 14 and 15, a device link profile creating unit 16, a device link color conversion unit 17, an image output unit 18, a color measurement unit 19, and a color reproduction characteristic modifying unit 20. These functions are realized when a central processing unit (CPU) 91 (see FIG. 6) reads a program from a magnetic disk device 93 (see FIG. 6) into a memory 92 (see FIG. 6) and executes it.

The target color reproduction characteristic obtaining unit 11 obtains data representing the relationship between input color values of the target device, which is an example of a first device, and color values of a device-independent color space representing output colors of the target device corresponding to the input color values (hereinafter, the data is referred to as "target color reproduction characteristic"). For example, CMYK data is obtained as the input color values, and L*a*b* data is obtained as the color values of the device-independent color space.

The printer color reproduction characteristic obtaining unit 12 obtains data representing the relationship between input color values of the printer, which is an example of a second device, and color values of a device-independent color space representing output colors of the printer corresponding to the input color values (hereinafter, the data is referred to as "printer color reproduction characteristic"). For example, CMYK data is obtained as the input color values, and L*a*b* data is obtained as the color values of the device-independent color space.

The option specification receiving unit 13 receives the specification of options in the case of creating a device link profile. As the options, storage of specific colors, a gamut mapping scheme, the number of grid points of a profile, a limit value of the total amount for the printer, and the like are specified. Particularly, in the exemplary embodiment, a paper white correction method is specified.

The paper white correcting units 14 and 15 perform paper white correction on color values of a device-independent color space in an input color reproduction characteristic on the basis of the option specification received by the option specification receiving unit 13. If the color values of the device-independent color space are L*a*b* data, the paper white correcting units 14 and 15 convert the L*a*b* data into XYZ values, and perform paper white correction in an XYZ color space.

The following may be used as a paper white correction method.

A first method is a method for determining XYZ values at a reference white point (D50 or the like) in an XYZ color space, dividing the XYZ values by XYZ values of paper white, respectively, and multiplying the quotients obtained thereby by target XYZ values. This method is expressed by the following equations. Here, uncorrected XYZ values are represented by (X, Y, Z), the XYZ values at the reference white point are represented by (Xn, Yn, Zn), the XYZ values of paper white used in a corresponding device are represented by (Xo, Yo, Zo), and corrected XYZ values are represented by (X', Y', Z').

$$X'=X*Xn/Xo$$

$$Y'=Y*Yn/Yo$$

$$Z'=Z*Zn/Zo$$

A second method is a method for combining the corrected XYZ values (X', Y', Z') and the uncorrected XYZ values (X, Y, Z) using a weighting coefficient determined by total amount values of a corresponding device color space according to the related art.

Also, if the color values of the device-independent color space in the input color reproduction characteristic are L*a*b* data, the paper white correcting units 14 and 15 convert the corrected XYZ values into L*a*b* data, and output data representing the relationship between the input color values in the input color reproduction characteristic (e.g., CMYK data) and the L*a*b* data, the output data serving as a paper-white-corrected color reproduction characteristic.

The paper white correcting units 14 and 15 perform equivalent processes, but are separate from each other for convenience because the data input thereto is different. That is, a target color reproduction characteristic is input from the target color reproduction characteristic obtaining unit 11 to the paper white correcting unit 14, whereas a printer color reproduction characteristic is input from the printer color reproduction characteristic obtaining unit 12 to the paper white correcting unit 15.

In the exemplary embodiment, a paper-white-corrected color reproduction characteristic of the target device is used as an example of a first color reproduction characteristic that is obtained by correcting a color reproduction characteristic of a first device in accordance with a color of a first medium used for printing in the first device, and the paper white correcting unit 14 is provided as an example of a first color reproduction characteristic obtaining unit that obtains a first color reproduction characteristic. Also, a paper-white-corrected color reproduction characteristic of the printer is used as an example of a second color reproduction characteristic that is obtained by correcting a color reproduction characteristic of a second device in accordance with a color of a second medium used for printing in the second device, and the paper white correcting unit 15 is provided as an example of a second color reproduction characteristic obtaining unit that obtains a second color reproduction characteristic.

The device link profile creating unit 16 creates a device link profile for simulating a target color reproduction characteristic in the printer on the basis of the paper-white-corrected color reproduction characteristic of the target device output from the paper white correcting unit 14 and the paper-white-corrected color reproduction characteristic of the printer output from the paper white correcting unit 15. That is, the device link profile creating unit 16 creates a device link profile for converting color data that depends on the target device into color data that depends on the printer. Here, the technology according to Japanese Unexamined Patent Application Publication No. 2002-152543 may be used for creating a device link profile. In the exemplary embodiment, a device link profile is used as an example of a color conversion coefficient, and the device link profile creating unit 16 is provided as an example of a generating unit that generates and regenerates a color conversion coefficient.

The device link color conversion unit 17 performs color conversion for simulating a target color reproduction characteristic in the printer. That is, the device link color conversion unit 17 converts color data of a color image from color data that depends on the target device into color data that depends on the printer using the device link profile created by the device link profile creating unit 16. Here, as the color data of a color image, color data that is created by changing each of C, M, Y, and K in the range from 0 to 100 may be used, for example.

The image output unit 18 outputs an image on which color conversion has been performed. That is, the image output unit 18 outputs, using the printer, the printer-dependent color data of the color image generated through the conversion performed by the device link color conversion unit 17.

The color measurement unit 19 performs color measurement on the color image output from the printer, thereby obtaining color measurement values, that is, color values of a device-independent color space. When it is assumed that the color data of the color image is color data created by changing C, M, Y, and K, L*a*b* data is obtained as the color values of the device-independent color space with respect to the CMYK data of the color data. Alternatively, the color measurement unit 19 may perform color measurement in accordance with an operation of sliding a colorimeter over a color image performed by a user, or may perform color measurement in accordance with detection of output of a color image in the printer.

The color reproduction characteristic modifying unit 20 judges whether creation of a device link profile is to be repeated or ended on the basis of actual measurement errors between the color values of the device-independent color space (e.g., L*a*b* data) in the paper-white-corrected color reproduction characteristic of the target device corresponding to the color data of a color image and the color values of the device-independent color space (e.g., L*a*b* data) obtained through color measurement performed on the color data of the color image output from the printer by the color measurement unit 19. Then, in the case of repeating creation of a device link profile, the color reproduction characteristic modifying unit 20 modifies the color values of the device-independent color space of the target device for recreating a device link profile on the basis of the actual measurement errors.

Here, in order to judge whether creation of a device link profile is to be repeated or ended, the following method may be used, for example. That is, color differences as actual measurement errors of color data of plural color images are obtained, a device link profile is recreated if the average of these color differences is three or more, and creation of a device link profile is ended if the average is less than three. The evaluation value used for the judgment is not limited to an average, and may be a maximum value, root mean square (RMS), 95 percentile, or the like.

Also, modification of the color values of the device-independent color space of the target device may be performed by subtracting the foregoing actual measurement errors from the unmodified color values of the device-independent color space. The method for modifying the color values of the device-independent color space is not limited thereto, and a method for modifying the color values by performing different weighting on the actual measurement errors in each color region may also be used. Note that, in the region outside the color gamut of the printer, the actual measurement errors are large and thus it is appropriate that the color values of the device-independent color space are not modified there.

In the exemplary embodiment, the color reproduction characteristic modifying unit 20 is provided as an example of a modifying unit that modifies a first color reproduction characteristic and that repeatedly modifies a modified first color reproduction characteristic.

Next, the operation of the color conversion apparatus 10 according to the exemplary embodiment will be described.

Figure 2:
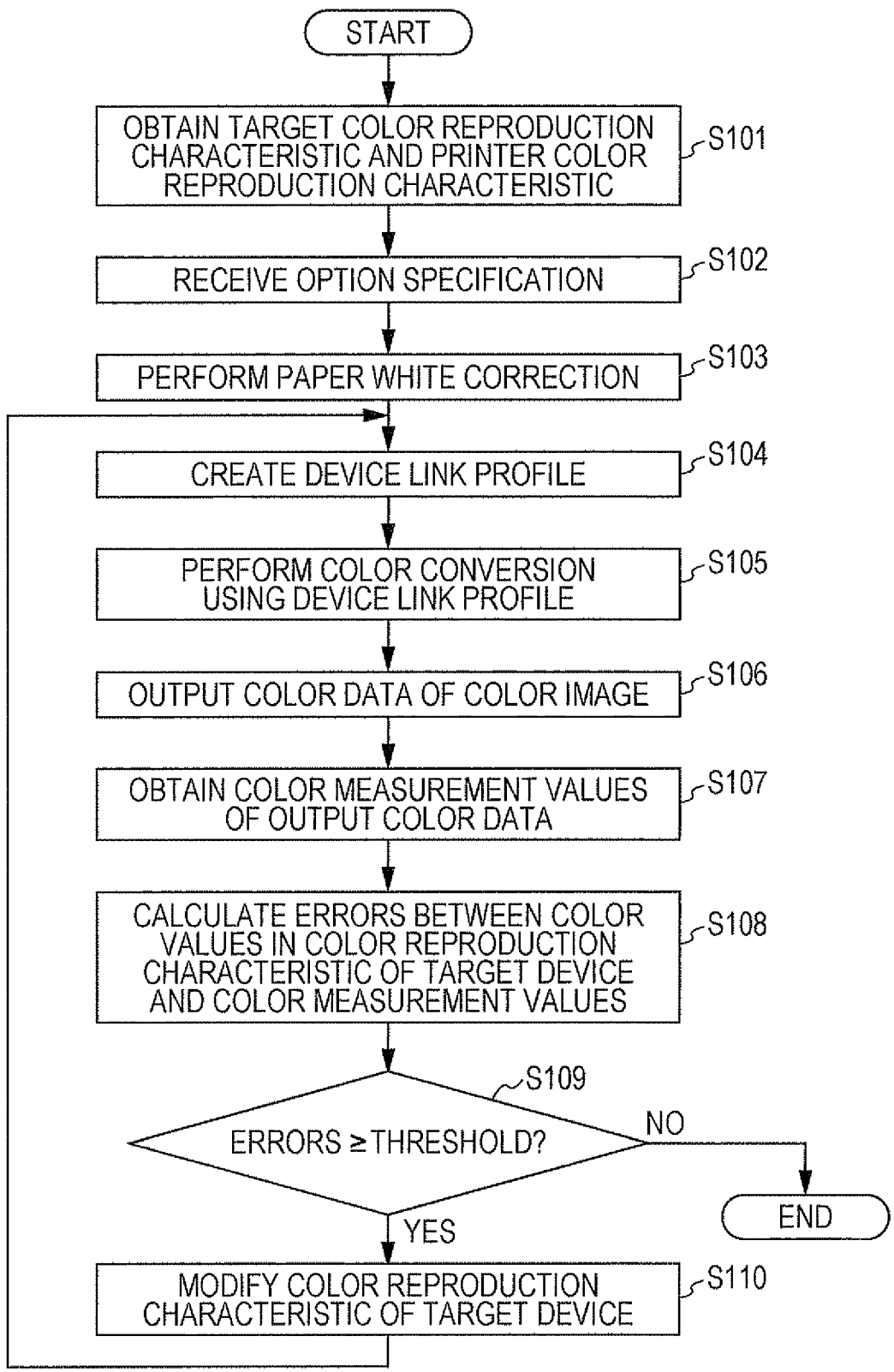
FIG. 2 is a flowchart illustrating an example operation of the color conversion apparatus according to the exemplary embodiment of the present invention.

FIG. 2 is a flowchart illustrating an example operation of the color conversion apparatus 10 according to the exemplary embodiment.

As illustrated in FIG. 2, in the color conversion apparatus 10, the target color reproduction characteristic obtaining unit 11 obtains a target color reproduction characteristic, and the printer color reproduction characteristic obtaining unit 12 obtains a printer color reproduction characteristic (step 101).

Then, the option specification receiving unit 13 receives specification of options regarding a paper white correction method and the like (step 102).

Then, the paper white correcting units 14 and 15 perform paper white correction on the target color reproduction characteristic obtained by the target color reproduction characteristic obtaining unit 11 and the printer color reproduction characteristic obtained by the printer color reproduction characteristic obtaining unit 12, respectively, on the basis of the specified options (step 103).

Accordingly, the device link profile creating unit 16 creates a device link profile on the basis of the paper-white-corrected color reproduction characteristic of the target device output from the paper white correcting unit 14 and the paper-white-corrected color reproduction characteristic of the printer output from the paper white correcting unit 15 (step 104).

After that, the device link color conversion unit 17 converts the color data of a color image from color data that depends on the target device into color data that depends on the printer using the device link profile (step 105).

Then, the image output unit 18 outputs, using the printer, the printer-dependent color data of the color image generated through the conversion (step 106).

Then, the color measurement unit 19 performs color measurement on the output color data of the color image, thereby obtaining color measurement values (step 107).

Then, the color reproduction characteristic modifying unit 20 compares the color values of the device-independent color space obtained from the paper-white-corrected color reproduction characteristic of the target device with the color measurement values obtained in step 107, thereby calculating the errors therebetween (step 108). Here, as the color values of the device-independent color space obtained from the paper-white-corrected color reproduction characteristic of the target device, color measurement values may be used if the color reproduction characteristic includes the color measurement values. Alternatively, if the color reproduction characteristic is an International Color Consortium (ICC) profile or the like, the values equivalent to color measurement values obtained using it may be used. In addition, as the color values of the device-independent color space, the values obtained in step 103 may be transmitted from the paper white correcting unit 14 to the color reproduction characteristic modifying unit 20, or a user may set values to the color reproduction characteristic modifying unit 20.

Then, the color reproduction characteristic modifying unit 20 judges whether the errors calculated in step 108 are equal to or larger than a threshold (step 109).

As a result, if it is judged that the errors are equal to or larger than the threshold, the color reproduction characteristic modifying unit 20 modifies the color values of the device-independent color space of the target device for recreating a device link profile (step 110), and the process returns to step 104, where recreation of a device link profile is performed.

On the other hand, if it is judged that the errors are smaller than the threshold, the process ends. At this time, post-processing may be performed. The post-processing includes processing for reproducing saturated colors in the case of outputting the color data of the target device from the printer without converting the color data when reproduction of characters or the like is to be performed, for example.

Next, the operation illustrated in FIG. 2 will be described using specific symbols. In the description given below, an L*a*b* color space is used as the device-independent color space. Also, the same CMYK data is associated with all the L*a*b* data in the same equation, but the CMYK data is not referred to except when necessary.

First, the L*a*b* data in the target color reproduction characteristic obtained by the target color reproduction characteristic obtaining unit 11 in step 101 is represented by $Lab_{Target}$, the L*a*b* data obtained through paper white correction performed on $Lab_{Target}$ by the paper white correcting unit 14 in step 103 is represented by $Lab'_{Target}$, and the L*a*b* data obtained through color measurement performed on the color image by the color measurement unit 19 in step 107 is represented by $Lab_{color\ measurement}$. Then, $Lab'_1$, which is the L*a*b* data obtained after the color reproduction characteristic modifying unit 20 performs the first modification in step 110, may be obtained using the following equation. In this equation, a three-dimensional vector (L*, a*, b*) is represented by Lab.

$$Lab'_1 = Lab'_{Target} + \alpha(Lab'_{color\ measurement} - Lab'_{Target}) \quad \text{equation 1}$$

In equation 1, the first term of the right side is the L*a*b* data of the target device used for first creating a device link profile. The second term of the right side is a value for modifying the first term of the right side, which is calculated by multiplying an appropriate weight α by an error that occurs when simulation (simulated printing) based on the target color reproduction characteristic is performed in the printer (hereinafter referred to as "simulation error"). In the exemplary embodiment, simulation is performed using the color reproduction characteristic obtained through paper white correction performed by the paper white correcting unit 14, and thus it is necessary that equation 1 is calculated in the color space where the paper white correction has been performed. Therefore, as can be seen in equation 1, a simulation error is calculated using $Lab'_{color\ measurement}$ obtained by performing paper white correction on $Lab_{color\ measurement}$. Also, as the L*a*b* data to be modified, $Lab'_{Target}$ obtained by performing paper white correction on $Lab_{Target}$ is used.

Now, the case of repeating creation of a device link profile, illustrated in the flowchart in FIG. 2, is considered. In this case, modifications are repeatedly performed on the L*a*b* data of the target device used for creating a device link profile. Hereinafter, the (i+1)-th modification among them will be described (i=1, 2, 3, ... ).

First, the L*a*b* data obtained through paper white correction performed on $Lab_{Target}$ by the paper white correcting unit 14 in step 103 is represented by $Lab'_{Target}$, as in equation 1. Also, the L*a*b* data obtained in step 110 at the i-th modification is represented by $Lab'_i$, and the L*a*b* data obtained through color measurement performed on a color image by the color measurement unit 19 in step 107 at the i-th modification is represented by $Lab_{i\text{-th\ color\ measurement}}$. Then, $Lab'_{i+1}$, which is the L*a*b* data obtained through the (i+1)-th modification performed by the color reproduction characteristic modifying unit 20 in step 110, is obtained using the following equation in accordance with equation 1. In this equation, too, a three-dimensional vector (L*, a*, b*) is represented by Lab.

$$Lab'_{i+1} = Lab''_i + \alpha(Lab'_{i\text{-th\ color\ measurement}} - Lab'_{Target}) \quad \text{equation 2}$$

It is necessary that equation 2 is calculated in the color space where paper white correction has been performed, and thus, as in equation 1, a simulation error is calculated using $Lab'_{i\text{-th\ color\ measurement}}$ obtained by performing paper white correction on $Lab_{i\text{-th\ color\ measurement}}$. Also, in accordance with equation 1, $Lab''_i$ obtained by performing paper white correction on $Lab'_i$ is used as the L*a*b* data to be modified.

However, the L*a*b* data obtained through the preceding modification is already corrected in a color space in view of paper white correction. Thus, if the L*a*b* data is processed in accordance with equation 2, paper white correction is performed thereon more than necessary.

Therefore, in the exemplary embodiment, paper white correction is not performed on the L*a*b* data obtained through the preceding correction. In this case, $Lab'_{i+1}$, which is the L*a*b* data obtained through the (i+1)-th modification performed by the color reproduction characteristic modifying unit 20 in step 110, is obtained using the following equation. In this equation, too, a three-dimensional vector (L*, a*, b*) is represented by Lab.

$$Lab'_{i+1} = Lab'_i + \alpha(Lab'_{i\text{-th\ color\ measurement}} - Lab'_{Target}) \quad \text{equation 3}$$

Hereinafter, a detailed description will be given of the color reproduction characteristic modifying unit 20, serving as an example of a color reproduction characteristic modifying device that modifies L*a*b* data using equation 3. Here, assume that a relativization process is performed as paper white correction.

Figure 3:
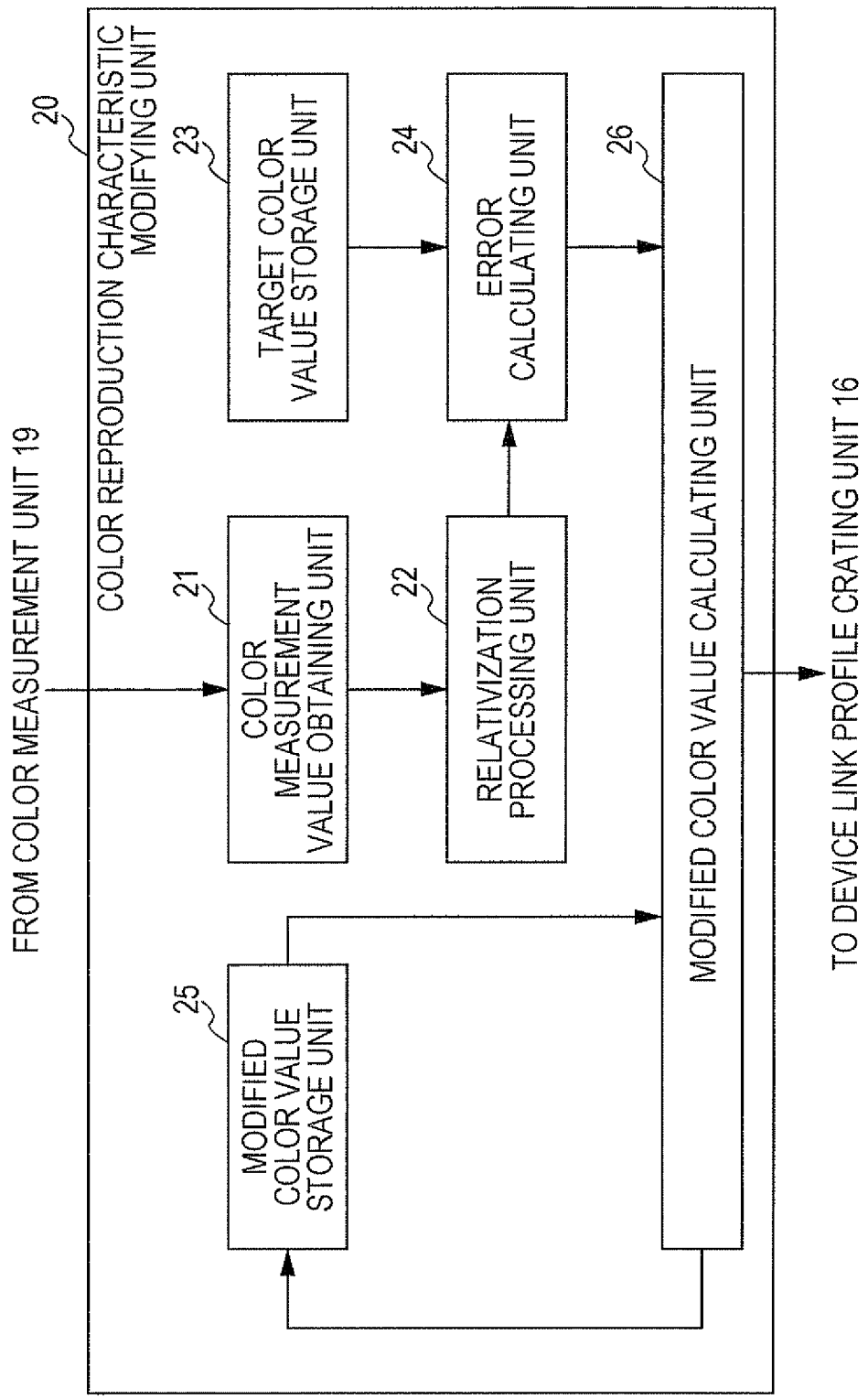
FIG. 3 is a block diagram illustrating an example functional configuration of a color reproduction characteristic modifying unit in the color conversion apparatus according to the exemplary embodiment of the present invention.

FIG. 3 is a block diagram illustrating an example functional configuration of the color reproduction characteristic modifying unit 20 in this case.

As illustrated in FIG. 3, the color reproduction characteristic modifying unit 20 includes a color measurement value obtaining unit 21, a relativization processing unit 22, a target color value storage unit 23, an error calculating unit 24, a modified color value storage unit 25, and a modified color value calculating unit 26. Among them, the target color value storage unit 23 and the modified color value storage unit 25 are realized by the magnetic disk device 93 (see FIG. 6), for example. Also, the color measurement value obtaining unit 21, the relativization processing unit 22, the error calculating unit 24, and the modified color value calculating unit 26 are realized when the CPU 91 (see FIG. 6) reads a program from the magnetic disk device 93 (see FIG. 6) into the memory 92 (see FIG. 6) and executes it.

The color measurement value obtaining unit 21 obtains L*a*b* data, which is color measurement values obtained through color measurement performed on a color image from the color measurement unit 19. In the exemplary embodiment, the color measurement value obtaining unit 21 is provided as an example of a third obtaining unit that obtains a color reproduction characteristic in a result of simulated printing.

The relativization processing unit 22 performs a relativization process on the L*a*b* data obtained by the color measurement value obtaining unit 21. If the L*a*b* data stored in the modified color value storage unit 25 (described below) is read, a relativization process is not performed on the L*a*b* data. In the exemplary embodiment, the relativization processing unit 22 is provided as an example of a correcting unit that corrects a color reproduction characteristic in a result of simulated printing in accordance with a color of a second medium.

The target color value storage unit 23 stores the L*a*b* data in the paper-white-corrected color reproduction characteristic of the target device output from the paper white correcting unit 14. In the exemplary embodiment, a function of reading information from the magnetic disk device 93 of the target color value storage unit 23 is provided as an example of a first obtaining unit that obtains a first color reproduction characteristic.

The error calculating unit 24 calculates the error between the L*a*b* data on which a relativization process has been performed by the relativization processing unit 22 and the L*a*b* data read from the target color value storage unit 23. If the error is equal to or larger than a threshold, the error calculating unit 24 instructs the modified color value calculating unit 26 to perform operation. If the error is smaller than the threshold, the error calculating unit 24 outputs an instruction to end creation of a device link profile. In the exemplary embodiment, an error is used as an example of a difference, and the error calculating unit 24 is provided as an example of a calculating unit that calculates a difference.

The modified color value storage unit 25 stores L*a*b* data, which is modified color values obtained through the preceding modification performed by the modified color value calculating unit 26, so that the L*a*b* data may be used in the present modification performed by the modified color value calculating unit 26. In the exemplary embodiment, the modified color value storage unit 25 is provided as an example of a memory that stores a first color reproduction characteristic obtained by adding a value that is based on a difference to a first color reproduction characteristic obtained through the preceding modification. Also, a function of reading information from the magnetic disk device 93 of the modified color value storage unit 25 is provided as an example of a second obtaining unit that obtains a first color reproduction characteristic obtained through the preceding modification.

The modified color value calculating unit 26 modifies the L*a*b* data read from the modified color value storage unit 25 on the basis of the error calculated by the error calculating unit 24, and outputs L*a*b* data as modified color values to the device link profile creating unit 16. In the exemplary embodiment, the modified color value calculating unit 26 is provided as an example of an adding unit that adds a value that is based on a difference to a first color reproduction characteristic obtained through the preceding modification or as an example of a modifying unit that modifies the first color reproduction characteristic obtained through the preceding modification on the basis of the difference.

Next, the operation of the color reproduction characteristic modifying unit 20 in this case will be described. Here, a description will be given of the operation in the case of performing the (i+1)-th modification as in equation 3 using the symbols used in equation 3.

Figure 4:
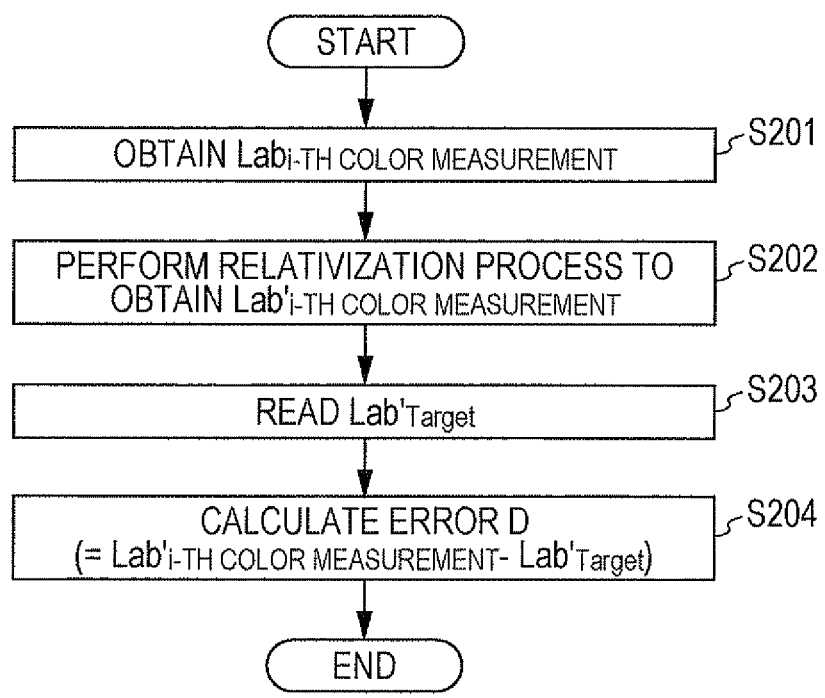
FIG. 4 is a flowchart illustrating an example operation of the color reproduction characteristic modifying unit in the color conversion apparatus according to the exemplary embodiment of the present invention.

FIG. 4 is a flowchart illustrating an example operation performed by the color reproduction characteristic modifying unit 20 so that an error is calculated by the error calculating unit 24.

In the color reproduction characteristic modifying unit 20, the color measurement value obtaining unit 21 obtains $Lab_{i\text{-th color measurement}}$, which is obtained through color measurement performed on a color image, from the color measurement unit 19 (step 201).

Then, the relativization processing unit 22 performs a relativization process on $Lab_{i\text{-th color measurement}}$, thereby obtaining $Lab'_{i\text{-th color measurement}}$ (step 202). Note that the relativization process performed here is a relativization process in which the color of paper used for printing in the printer serves as a reference.

Then, the error calculating unit 24 reads $Lab'_{Target}$ stored in the target color value storage unit 23 (step 203).

Then, the error calculating unit 24 subtracts $Lab'_{Target}$ read in step 203 from $Lab'_{i\text{-th color measurement}}$ obtained in step 202, thereby calculating an error D (step 204).

Figure 5:
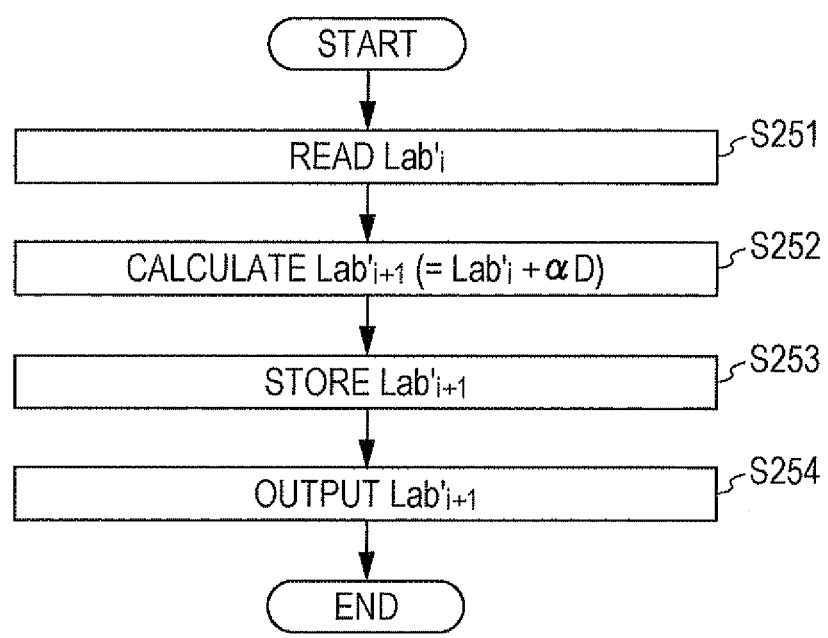
FIG. 5 is a flowchart illustrating an example operation of the color reproduction characteristic modifying unit in the color conversion apparatus according to the exemplary embodiment of the present invention.

FIG. 5 is a flowchart illustrating an example operation performed by the corrected color value calculating unit 26 in a case where it is judged that the error is equal to or larger than the threshold in step 109 in FIG. 2. This flowchart illustrates the details of step 110 of the flowchart in FIG. 2.

First, the modified color value calculating unit 26 reads $Lab'_i$ stored in the modified color value storage unit 25 (step 251).

Then, the modified color value calculating unit 26 adds the value obtained by multiplying the error D calculated in step 204 by the weight α to $Lab'_i$, thereby calculating $Lab'_{i+1}$ (step 252).

Then, the modified color value calculating unit 26 stores the calculated $Lab'_{i+1}$ in the modified color value storage unit 25 so that $Lab'_{i+1}$ may be used in the (i+2)-th modification (step 253).

Then, the modified color value calculating unit 26 outputs $Lab'_{i+1}$ calculated in step 252 to the device link profile creating unit 16 in association with the CMYK data corresponding to the color data of the color image on which color measurement has been performed by the color measurement unit 19 (step 254).

The description of the exemplary embodiment ends now.

The color conversion apparatus 10 according to the exemplary embodiment may be realized in a general-purpose computer, such as a personal computer (PC).

Hereinafter, a hardware configuration of a computer 90, which is an example of such a general-purpose computer, will be described.

Figure 6:
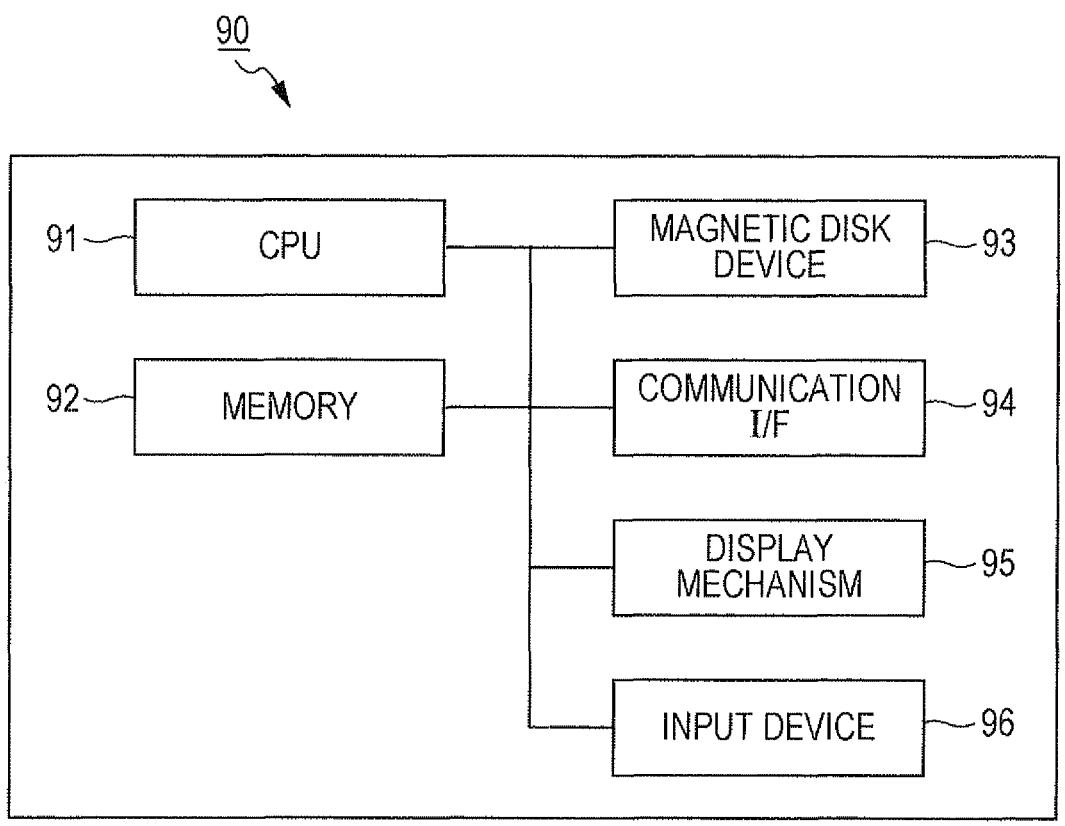
FIG. 6 is a diagram illustrating a hardware configuration of a computer capable of realizing the exemplary embodiment of the present invention.

FIG. 6 is a diagram illustrating a hardware configuration of the computer 90.

As illustrated in FIG. 6, the computer 90 includes the CPU 91 serving as a processing unit, and the memory 92 and the magnetic disk device (hard disk drive (HDD)) 93 serving as a memory. Here, the CPU 91 executes various types of software, such as an operating system (OS) and an application, thereby realizing the foregoing individual functions. The memory 92 is a storage area that stores various types of software and data used for executing the software. The magnetic disk device 93 is a storage area that stores data input to the various types of software and data output from the various types of software.

Furthermore, the computer 90 includes a communication interface (I/F) 94 for communicating with an external apparatus or the like, a display mechanism 95 including a video memory and a display, and an input device 96 including a keyboard and a mouse.

The program realizing the exemplary embodiment may be provided using a communication unit, and also may be provided by being stored in a recording medium, such as a compact disc read only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color conversion coefficient generating apparatus comprising:

a first color reproduction characteristic obtaining unit that obtains a first color reproduction characteristic that is obtained by correcting a color reproduction characteristic of a first device in accordance with a color of a first medium used for printing in the first device;

a second color reproduction characteristic obtaining unit that obtains a second color reproduction characteristic that is obtained by correcting a color reproduction characteristic of a second device in accordance with a color of a second medium used for printing in the second device;

a modifying unit that modifies the first color reproduction characteristic obtained by the first color reproduction characteristic obtaining unit and that repeatedly modifies the modified first color reproduction characteristic; and a generating unit that generates a color conversion coefficient for performing, in the second device, simulated printing based on the color reproduction characteristic of the first device on the basis of the first color reproduction characteristic obtained by the first color reproduction characteristic obtaining unit and the second color reproduction characteristic obtained by the second color reproduction characteristic obtaining unit, and that regenerates the color conversion coefficient on the basis of the first color reproduction characteristic modified by the modifying unit and the second color reproduction characteristic obtained by the second color reproduction characteristic obtaining unit, wherein the modifying unit modifies the first color reproduction characteristic on which a preceding modification has been performed and which has not been corrected in accordance with the color of the first medium on the basis of a difference between the first color reproduction characteristic obtained by the first color reproduction characteristic obtaining unit and a color reproduction characteristic that is obtained by correcting, in accordance with the color of the second medium, a color reproduction characteristic in a result of the simulated printing using the color conversion coefficient that is regenerated on the basis of the first color reproduction characteristic on which the preceding modification has been performed.

2. The color conversion coefficient generating apparatus according to claim 1, wherein the modifying unit includes a correcting unit that does not correct the first color reproduction characteristic on which the preceding modification has been performed in accordance with the color of the first medium and that corrects the color reproduction characteristic in the result of the simulated printing in accordance with the color of the second medium.

3. The color conversion coefficient generating apparatus according to claim 2, wherein the modifying unit further includes a calculating unit that calculates the difference between the first color reproduction characteristic obtained by the first color reproduction characteristic obtaining unit and the color reproduction characteristic that is obtained by correcting, with the correcting unit, the color reproduction characteristic in the result of the simulated printing, and an adding unit that adds a value corresponding to the difference calculated by the calculating unit to the first color reproduction characteristic on which the preceding modification has been performed and that has not been corrected by the correcting unit in accordance with the color of the first medium.

4. The color conversion coefficient generating apparatus according to claim 3, wherein the modifying unit further includes a memory that stores a new first color reproduction characteristic that is obtained by adding, with the adding unit, the value corresponding to the difference to the first color reproduction characteristic on which the preceding modification has been performed, wherein the correcting unit does not correct the new first color reproduction characteristic in accordance with the color of the first medium, and corrects, in accordance with the color of the second medium, the color reproduction characteristic in the result of the simulated printing performed using a new color conversion coefficient that is regenerated on the basis of the new first color reproduction characteristic, wherein the calculating unit calculates a new difference between the first color reproduction characteristic obtained by the first color reproduction characteristic obtaining unit and a color reproduction characteristic that is obtained by correcting, with the correcting unit, the color reproduction characteristic in the result of the simulated printing performed using the new color conversion coefficient, and wherein the adding unit adds a value corresponding to the new difference calculated by the calculating unit to the new first color reproduction characteristic that is stored in the memory and that has not been corrected by the correcting unit in accordance with the color of the first medium.

5. A color reproduction characteristic modifying device comprising:

a first obtaining unit that obtains a first color reproduction characteristic that is obtained by correcting a color reproduction characteristic of a first device in accordance with a color of a first medium used for printing in the first device;

a second obtaining unit that obtains the first color reproduction characteristic on which a preceding modification has been performed;

a third obtaining unit that obtains a color reproduction characteristic in a result of simulated printing that is based on the color reproduction characteristic of the first device performed in a second device using a color conversion coefficient that is generated on the basis of the first color reproduction characteristic on which the preceding modification has been performed and a second color reproduction characteristic that is obtained by correcting a color reproduction characteristic of the second device in accordance with a color of a second medium used for printing in the second device;

a correcting unit that does not correct the first color reproduction characteristic on which the preceding modification has been performed and which has been obtained by the second obtaining unit in accordance with the color of the first medium and that corrects the color reproduction characteristic in the result of the simulated printing obtained by the third obtaining unit in accordance with the color of the second medium;

a calculating unit that calculates a difference between the first color reproduction characteristic obtained by the first obtaining unit and the color reproduction characteristic obtained by correcting, with the correcting unit, the color reproduction characteristic in the result of the simulated printing; and a modifying unit that modifies the first color reproduction characteristic on which the preceding modification has been performed and which has not been corrected by the correcting unit in accordance with the color of the first medium on the basis of the difference calculated by the calculating unit.

6. A non-transitory computer readable medium storing a program causing a computer to execute a process, the process comprising:

obtaining a first color reproduction characteristic that is obtained by correcting a color reproduction characteristic of a first device in accordance with a color of a first medium used for printing in the first device;

obtaining the first color reproduction characteristic on which a preceding modification has been performed;

obtaining a color reproduction characteristic in a result of simulated printing that is based on the color reproduction characteristic of the first device performed in a second device using a color conversion coefficient that is generated on the basis of the first color reproduction characteristic on which the preceding modification has been performed and a second color reproduction characteristic that is obtained by correcting a color reproduction characteristic of the second device in accordance with a color of a second medium used for printing in the second device;

not correcting the first color reproduction characteristic on which the preceding modification has been performed and correcting the color reproduction characteristic in the result of the simulated printing in accordance with the color of the second medium;

calculating a difference between the first color reproduction characteristic that is obtained by correcting the color reproduction characteristic of the first device in accordance with the color of the first medium and the color reproduction characteristic obtained by correcting the color reproduction characteristic in the result of the simulated printing; and modifying the first color reproduction characteristic on which the preceding modification has been performed and which has not been corrected in accordance with the color of the first medium on the basis of the calculated difference.

* * * * *